United States Patent [19]

McFarlane

[11] Patent Number: 5,310,122
[45] Date of Patent: May 10, 1994

[54] METHOD AND APPARATUS FOR PULVERIZING GLASS

[76] Inventor: John M. McFarlane, 18 Rye Rd., Rochester, N.Y. 14626

[21] Appl. No.: 764,550

[22] Filed: Sep. 24, 1991

[51] Int. Cl.⁵ .................................. B02C 19/00
[52] U.S. Cl. ................................ 241/60; 241/79.1; 241/99; 241/275
[58] Field of Search ............... 241/19, 24, 99, 79, 241/79.1, 280, 69, 275, 60; 209/273

[56] References Cited

U.S. PATENT DOCUMENTS

| | | |
|---|---|---|
| 1,338,152 | 4/1920 | O'Neil et al. |
| 1,796,545 | 3/1931 | Taylor |
| 1,832,468 | 11/1931 | McMillan et al. |
| 2,082,419 | 6/1937 | Rietz |
| 2,333,247 | 11/1943 | Harris et al. ............ 241/60 |
| 2,474,314 | 6/1949 | Koehne ..................... 241/79 |
| 2,558,255 | 6/1951 | Johnson et al. |
| 2,561,564 | 7/1951 | Crites |
| 2,609,151 | 9/1952 | D'Aragon ................. 241/79 |
| 2,700,512 | 1/1955 | Denovan et al. |
| 2,752,098 | 6/1956 | Adams |
| 2,889,119 | 6/1959 | Andreas |
| 2,922,589 | 1/1960 | Sheldon |
| 3,146,958 | 9/1964 | Wallace, Jr. |
| 3,353,756 | 11/1967 | Morgenson |
| 3,584,334 | 6/1971 | Moriya |
| 3,713,596 | 1/1973 | Hoffman |
| 3,823,878 | 7/1974 | Ishikura |
| 3,938,745 | 2/1976 | Gladwin ..................... 241/99 |
| 3,946,953 | 3/1976 | Hato |
| 3,987,970 | 10/1976 | Burkett .................... 241/275 |
| 4,119,453 | 10/1978 | Knezevich ................ 241/275 |
| 4,347,986 | 9/1982 | Haddon ..................... 241/74 |
| 4,566,639 | 1/1986 | Williams |
| 4,645,131 | 2/1987 | Hailey |
| 4,836,915 | 6/1989 | Frejborg ................... 209/273 |
| 4,921,173 | 5/1990 | Bartley ..................... 241/79.1 |
| 4,934,613 | 6/1990 | Kukuch ..................... 241/79 |

FOREIGN PATENT DOCUMENTS

| | | |
|---|---|---|
| 2338398 | 8/1974 | Fed. Rep. of Germany |
| 2901769 | 6/1979 | Fed. Rep. of Germany |
| 1524924 | 11/1989 | U.S.S.R. ..................... 241/275 |

*Primary Examiner*—Richard K. Seidel
*Assistant Examiner*—Allan M. Schrock
*Attorney, Agent, or Firm*—Cumpston & Shaw

[57] ABSTRACT

A glass grinder for breaking glass from particle or fragment configuration to a grit of a predetermined size. The grinder employs a grinding chamber having an upper and lower portion wherein glass fragments are broken into relatively large particulate size in the upper chamber and passes into the lower chamber where glass is further impacted by blades and driven into a peripheral dam of glass particles. As the glass impacts the dam, it is further broken down to the desired grit size. Overflow from the grit dam exits the chamber under a reduced pressure to control dust production.

4 Claims, 2 Drawing Sheets

METHOD AND APPARATUS FOR PULVERIZING GLASS

The present invention relates to glass grinders for reducing the size of glass fragments or particles, and more particularly, to a glass grinder having a blade rotatably mounted in a grinding chamber, the grinding chamber including a peripheral flange below the blade for forming a peripheral dam of glass particles, such that the blade impels glass particles into the dam to further reduce the size of the particles.

BACKGROUND OF THE INVENTION

U.S. Pat. No. 2,558,255 to Johnson discloses a bottle smasher having disintegrating hammers which rotate about a central axis to substantially pulverize the glass by repeated blows as the glass falls downward to contact the hammers.

U.S. Pat. No. 4,566,639 to Williams discloses a grinding mill having a grinding chamber which is open to a fluid drying medium.

U.S. Pat. No. 4,645,131 to Hailey discloses a powder mill wherein particles are impacted by a rotor such that the impacted particles contact target plates disposed radially outward of the rotor. After the impact, the particles contact the target plate, the particles fall, by gravity, to the bottom of an inner shell where sweeper blades drive the particles by centrifugal action to discharge ports.

SUMMARY OF THE INVENTION

The glass grinder of the present invention includes a housing having a grinding chamber. A rotatable blade assembly is disposed within the grinding chamber and spaced from the vertical walls of the chamber. The grinding chamber includes a peripheral flange or annulus extending radially inward from the chamber wall beneath the blade assembly. Preferably, the blade assembly includes a carrier plate which substantially separates the chamber into an upper portion and a lower portion. The blade assembly includes upper blades extending from the carrier plate into the upper portion, and lower blades extending from the carrier plate into the lower portion.

Glass particles or fragments are introduced into the upper portion of the grinding chamber, wherein the glass contacts the upper blades. The upper blades reduce the glass to a particle size able to vertically pass between the grinding chamber wall and the periphery of the blade assembly. The particles pass by gravity between the periphery of the blade assembly and the grinding chamber wall. The glass particles accumulate along the peripheral flange to form a dam of particles. The lower blades and peripheral flange are spaced apart such that particles impacted by the lower blades are propelled into the dam where the particles are further reduced in size.

Accumulated glass grit of the desired size exits the grinding chamber through a plurality of apertures in the floor of the chamber. The exit area is maintained under a negative pressure to enhance the flow of the glass grit out of the chamber and reduce dust production.

As the present invention reduces the size of the glass particles by impacting glass into glass particles in the dam, wear on component parts of the grinder is significantly reduced. In addition, the present invention may be readily adjusted to produce a variety of grit sizes.

DETAILED DESCRIPTION OF THE PREFERRED EMBODIMENT

Figure 1:
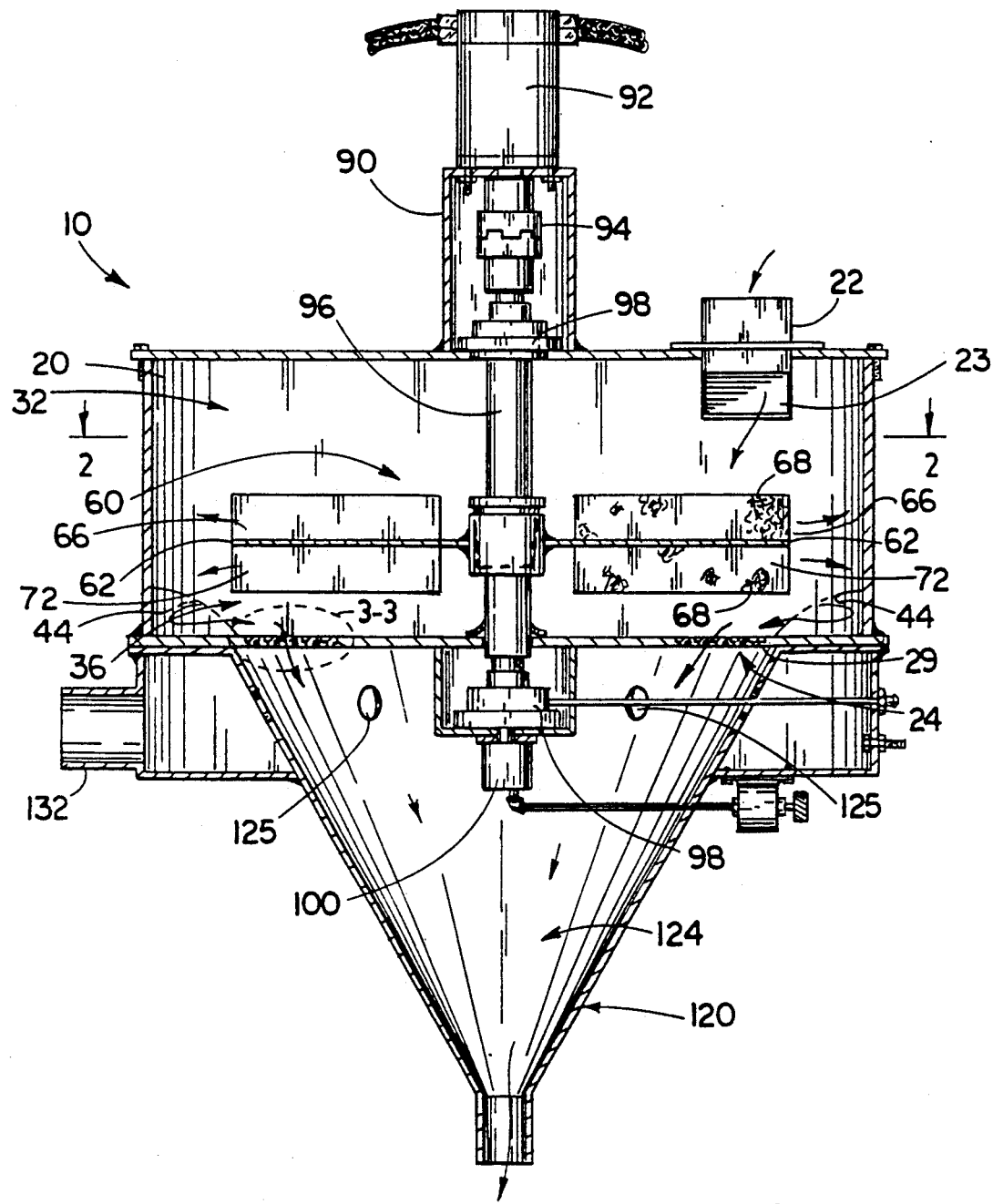
FIG. 1 is a partial cross sectional view of the glass grinding apparatus.

As shown in FIG. 1, the glass grinder 10 of the present invention includes a grinding chamber 20, a blade assembly 60, a drive assembly 90 and an exit assembly 120.

Figure 2:
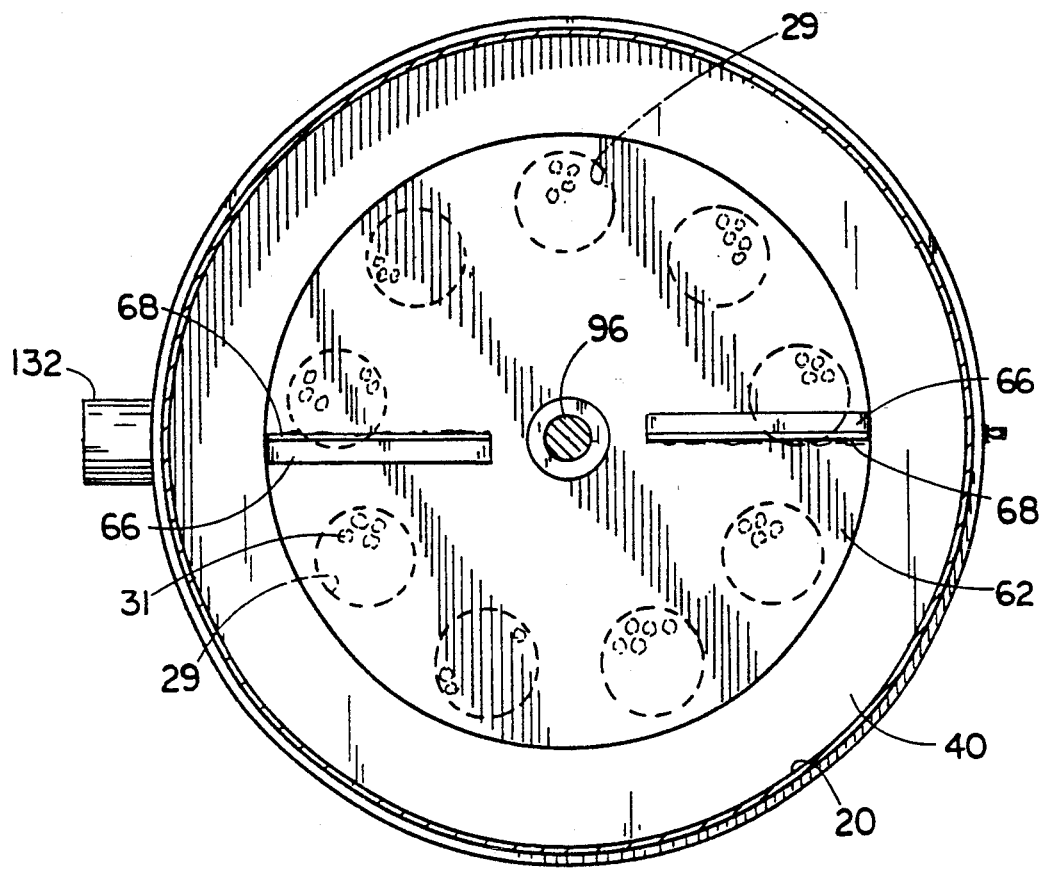
FIG. 2 is a cross sectional view taken along 2—2 of FIG. 1.

The grinding chamber 20 defines a vertical cylindrical volume having an inlet 22 at the top of the chamber and an outlet 24 at the bottom of the chamber. The inlet 22 includes a ramp 23 for introducing material into the chamber along an inclined trajectory to contact the blade assembly 60. The outlet 24 is formed by an orifice plate 28. As shown in FIGS. 1 and 2, the orifice plate 28 includes a plurality of apertures 29, wherein the center of each aperture is disposed upon a common radius from the center of the grinding chamber 20 and the orifice plate 28.

Figure 3:
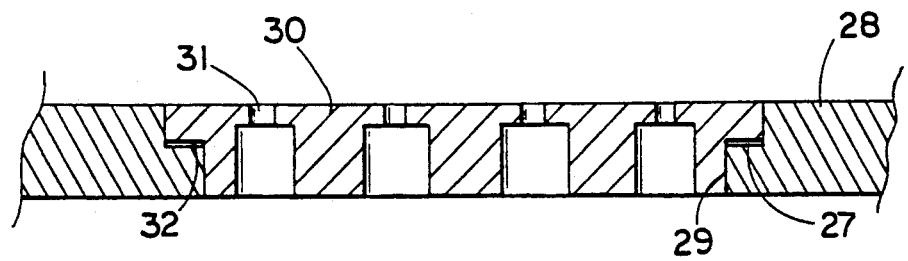
FIG. 3 is an enlarged cross section view of area 3—3 of FIG. 1.

Referring to FIG. 3, each aperture 29 includes a peripheral lip 27. A plug 30 is retained within each of the apertures 29. Each plug 30 includes a peripheral shoulder 33 which cooperates with the lip 27 so that the plug is substantially coplaner with the surrounding surface of the aperture plate 28. Each plug 30 includes a plurality openings 31. The openings 31 may be randomly or orderly located in the plug 30.

Referring to FIGS. 1–3, the diameter of the openings 31 vary as the opening extends through the plug 30. The opening 31 may be defined by an ⅛ inch to ½ inch diameter at the grinding chamber 20. The opening is then defined by a larger diameter facing the exit assembly 120. The larger diameter may be from 10 to 300 percent of the smaller diameter. Preferably, the larger diameter is sufficiently large to substantially preclude blocking of a given opening by glass grit.

A peripheral dam flange 40 extends radially inward from the wall of the grinding chamber 20. As shown in FIG. 1, the dam flange may be an integral portion of the orifice plate. Alternatively, the dam flange 40 may be a separate piece from the floor of the grinding chamber 20. As shown in FIGS. 1 and 2, the dam flange 40 is outside of the radius which includes the plugs 30. With respect to the flow of material through the grinding chamber 20, the dam flange is intermediate of the inlet 22 and the outlet 24. The dam flange 40 forms an annulus extending radially inward from the wall of the grinding chamber 20.

As shown in FIG. 1, the drive assembly 90 includes hydraulic motor 92, a flexible coupling 94, a drive shaft 96 and thrust bearings 98.

The drive shaft 96 is concentrically aligned with the grinding chamber 20 and extends from the top of the chamber through the bottom of the chamber passing through the center of the orifice Plate 28. The thrust bearings 98 engage the drive shaft 96 to retain the shaft within the grinding chamber 20. The hydraulic motor 92 is coupled to the shaft 96 above the chamber 20 by the flexible coupling 94.

A hydraulic actuator 100 is attached to the lower end of the shaft 96 below the grinding chamber 20. The actuator 100 allows for vertical displacement of the drive shaft 96 within the grinding chamber 20. Preferably, the actuator 100 moves the drive 96 approximately ½ to ¾ of an inch.

The blade assembly 60 is affixed to the drive shaft 96 to be rotatably mounted within the grinding chamber 20. The blade assembly 60 moves vertically as the drive shaft is vertically displaced by the actuator 100. The blade assembly 60 includes a carrier plate 62, upper blades 66 and lower blades 72. The carrier plate 62 is affixed to the shaft 96 and extends transversely from the shaft intermediate of the inlet 22 and the dam flange 40. The carrier plate 62 defines a periphery slightly larger than the outer periphery of the apertures 29 in the orifice plate 28. That is, the dam flange 40 extends radially inward to terminate slightly within the periphery of the blade assembly 60. The inlet 22 is located directly over the blade assembly 60 so that particles passing through the inlet contact the blade assembly.

As shown in FIGS. 1 and 2, the periphery of the carrier plate 62 is separated from the wall of the grinding chamber 20 to define an annulus there between. Preferably, the periphery of the carrier plate 62 is spaced from the wall by distance of approximately 1.5 to 2.5 inches and is oriented horizontally within the chamber 20. The carrier plate 62 substantially separates the grinding chamber 20 into an upper portion 32 above the plate and a lower portion 36 below the plate. The upper and lower portions 32, 36 of the grinding chamber 20 are connected by the annulus defined between the periphery of the carrier plate 62 and the grinding chamber wall.

The upper blades 66 project upward from the carrier plate 62. Preferably, the upper blades 66 are perpendicular to the carrier plate 62 and include a hardened lead surface 68 for impacting the glass. The hardened surface 68 is formed of stellite type material. The lower blades 72 project downward from the carrier plate 62. The lower blades 72 extend perpendicular from the carrier plate 62 and are spaced approximately 0.5 to 2.0 inches above the plane of the dam flange 40 with a preferred height of approximately 1 inch. Similar to the upper blades 66, the leading surface 74 of the lower blades 72 also include a hardened surface such as Stellite type material.

The terminal ends of the upper and lower blades 66, 72 are substantially coterminous with the periphery of the carrier plate 62. Therefore, a portion of the lower blades 72 overlies a portion of the dam flange 40. The upper and lower blades 66, 72 are affixed to the carrier plate 62 by welds or threaded fasteners. The carrier plate 62 and lower blades 72 are axially and radially spaced from the dam flange 40 by a sufficient distance such that upon operation of the grinder 10, a peripheral dam of glass particles forms on the dam flange and may extend upward into the annulus between the carrier plate 62 and the wall of the grinding chamber 20.

The exit assembly 120 is affixed to the grinding chamber 20 beneath the orifice plate 28 and plugs 30. The exit assembly 120 includes an exit chute 124 and a vacuum port 132. The exit chute 124 defines a funnel having an upper radius sized to encompass the orifices 29 of the orifice Plate 28 and a lower radius for directing glass grit into a collector bin (not shown). The upper portion of the exit chute 124 includes peripheral vents 125. The vents are fluidly connected to the vacuum port 132. A vacuum device 140 for reducing the pressure in the exit chute 124 may be affixed to the vacuum port 132.

Operation of the Glass Grinder

Preferably, rotation of the blade assembly 60 is initiated prior to introduction of glass into the grinding chamber 20. The blade assembly 60, as driven by the hydraulic motor 92, may be rotated at speeds from approximately 100 to 3,000RPMS. The speed of the blade assembly 60, the negative air pressure in the exit chute 124 and the vertical spacing of the lower blades 72 from the dam flange 40 may be adjusted to control the percentage of a particular glass size produced by the grinder 10.

Glass fragments, or particles are introduced into the grinding chamber 20 through the inlet chute 22. The ramp 23 directs the glass into the chamber 20 such that the glass is traveling in the same direction as the rotating blade assembly 60, and away from the inlet 22. The glass contacts the upper blades 66, and specifically, the hardened surface 68. The glass is broken into particle sizes which travel radially outward. The particles impact upon the chamber wall. Sufficiently small particles then descend in the annulus between the periphery of the blade assembly 60 and the grinding chamber wall, to pass from the upper portion 32 of the chamber 20 to the lower portion 36.

The glass particles pass into the lower portion 36 of the grinding chamber 20 and some particles collect on the flange 40 to form a dam 44 (shown in phantom in FIG. 1). The dam of glass particles 44 is formed along the dam flange 40 and the adjoining wall of the grinding chamber 20. Glass particles contacted by the lower blades 72 are thrown into the dam 44. As the glass particles impact the dam 44, the particles are further reduced to the desired grit size.

Upon introduction of further glass, and hence glass grit, the glass particles spill from the dam 44 and flow radially inward along the dam flange 40 and the orifice plate 28 to pass through the openings 31 in the plugs 30. The size of the glass grit which exits the chamber is also controlled by the size of the openings 31 in the plugs 30.

As the area beneath the orifice plate 28 has a relatively low pressure, the particles are drawn into the exit assembly 120. The articles fall into the exit chute 124 and pass to the collector bin while glass dust is removed from the exit chute and passes through the vacuum port 132.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed:

1. An apparatus for grinding glass particles and fragments to a predetermined size, comprising:
    (a) a housing including a substantially cylindrical grinding chamber having a peripheral wall, an inlet and a circular base plate which contains a plurality of apertures which extend through the thickness of said base plate, with a portion of the outer periphery of said base plate defining an area of damming glass during grinding;
    (b) said apertures having centers which are positioned on a line which is substantially concentric with the outer periphery of said base plate;

(c) a blade assembly rotatably mounted in the grinding chamber between the inlet and the base plate, the blade assembly including a carrier plate substantially separating the grinding chamber into an upper portion and a lower portion, with the blade assembly spaced from the peripheral wall by a distance sufficient to permit the passage of glass particles therethrough, said blade assembly having a plurality of blades extending from said carrier plate into the upper portion of said grinding chamber, and a plurality of lower blades extending from said carrier plate into the lower portion of said grinding chamber, said lower blades being spaced radially from said peripheral wall a sufficient distance to allow for the formation of a dam of glass particles on the outer periphery of the base plate during grinding, such that glass particles contacted by said lower blades impact said glass dam to further reduce the size of the glass particles; and (d) an exit assembly which defines an enclosed chamber fixed in sealed engagement to a bottom outside surface of said base plate, said assembly including vacuum means for creating a sufficient negative pressure to withdraw glass particles having a predetermined size through said apertures and into said exit assembly.

2. The apparatus of claim 1 which each aperture contains a removable plug which includes a plurality of openings through its thickness.

3. An apparatus for grinding glass particles and fragments to a predetermined size, comprising:

(a) a housing including a substantially cylindrical grinding chamber having a peripheral wall, an inlet and a circular base plate which contains a plurality of apertures which extend through the thickness of said base plate, with a portion of the outer periphery of said base plate defining an area for damming glass during grinding;

(b) said apertures having centers which are positioned on a line which is substantially concentric with the outer periphery of said base plate;

(c) a blade assembly rotatably mounted in the grinding chamber between the inlet and the base plate, the blade assembly including a carrier plate substantially separating the grinding chamber into an upper portion and lower portion, with the blade assembly spaced from the peripheral wall by a distance sufficient to permit the passage of glass particles therethrough, said blade assembly having a plurality of blades extending from said carrier plate into the upper portion of said grinding chamber, and a plurality of lower blades extending from said carrier plate into the lower portion of said grinding chamber, said lower blades being spaced radially from said peripheral wall a sufficient distance to allow for the formation of a dam of glass particles on the outer periphery of the base plate during grinding, such that glass particles contacted by said lower blades impact said glass dam to further reduce the size of the glass particles; and (d) an exit assembly which defines an enclosed chamber fixed in sealed engagement to a bottom outside surface of said base plate, said assembly including vacuum means for creating a sufficient negative pressure to withdraw glass particles having a predetermined size through said apertures and into said exit assembly, with said exit assembly further including an exit chute which directs the glass particles to a collector bin.

4. The apparatus of claim 3 in which each aperture contains a removable plug which includes a plurality of openings through its thickness.

* * * * *